United States Patent [19]
Tarr et al.

[11] Patent Number: 6,045,120
[45] Date of Patent: Apr. 4, 2000

[54] FLOW BALANCED SPILL CONTROL VALVE

[75] Inventors: Yul J. Tarr; Bradlee J. Stroia; Todd M. Wieland; Jeffrey J. Sullivan, all of Columbus, Ind.

[73] Assignee: Cummins Engine Company, Inc., Columbus, Ind.

[21] Appl. No.: 09/005,684

[22] Filed: Jan. 13, 1998

[51] Int. Cl.[7] ............................. F16K 39/02; F02M 37/04
[52] U.S. Cl. ............... 251/282; 251/129.02; 251/129.07; 123/506
[58] Field of Search ........................................ 251/282, 120, 251/121, 127, 129.02, 129.07; 123/458, 506

[56] References Cited

U.S. PATENT DOCUMENTS

| | | | |
|---|---|---|---|
| 2,747,612 | 5/1956 | Lee | 251/282 X |
| 2,826,215 | 3/1958 | Wolfslau et al. | |
| 2,897,836 | 8/1959 | Peters et al. | 251/282 X |
| 3,027,134 | 3/1962 | Nichols . | |
| 3,756,558 | 9/1973 | Okui | 251/282 |
| 4,582,294 | 4/1986 | Fargo . | |
| 4,653,723 | 3/1987 | Rizk et al. | 251/282 |
| 4,741,478 | 5/1988 | Teerman et al. . | |
| 4,836,498 | 6/1989 | Heron et al. . | |
| 4,905,960 | 3/1990 | Barnhart et al. . | |
| 5,022,436 | 6/1991 | Portolese . | |
| 5,551,466 | 9/1996 | De Pieri | 251/282 X |

FOREIGN PATENT DOCUMENTS

| | | |
|---|---|---|
| 841730 | 7/1960 | United Kingdom . |
| 2041173 | 9/1980 | United Kingdom . |

*Primary Examiner*—John Rivell
*Attorney, Agent, or Firm*—Nixon Peabody LLP; Charles M. Leedom Jr.; Tim L. Brackett Jr.

[57] ABSTRACT

A control valve comprising a valve housing including a valve cavity, an inlet means formed in the valve housing for directing fluid into the valve cavity, and an outlet means formed in the valve housing for directing fluid out of the valve cavity. The control valve further includes a valve element mounted for reciprocal movement in the valve cavity between open and closed positions and biased toward the closed position by fluid pressure forces. A valve seat is associated with the valve element which engages the valve seat when in the closed position and permits flow between the valve seat and the valve element when in the open position. A flow force inducing means is positioned adjacent the valve element for redirecting fluid from the inlet means through a predetermined flow path arranged relative to the valve element to cause fluid flow to impact the valve element and create flow induced forces of sufficient magnitude necessary to advantageously counteract the fluid pressure forces.

19 Claims, 10 Drawing Sheets

FLOW BALANCED SPILL CONTROL VALVE

TECHNICAL FIELD OF THE INVENTION

The present invention relates to a valve used in an internal combustion engines, and more particularly, to a control valve designed to use flow induced forces to counteract fluid pressure forces to maintain the control valve in an open position as desired during engine operation.

BACKGROUND OF THE INVENTION

The use of solenoid operated two-way valves in internal combustion engines has been ongoing for many years. These types of valves can be used in a variety of different applications to control the flow of fluid through a fluid circuit. For example, U.S. Pat. No. 4,905,960 to Barnhart et al. discloses a solenoid operated two-way valve for controlling the flow of fuel into a timing chamber of an electronically controlled unit injector to permit control over both the quantity and timing of fuel injected into the combustion chamber of an internal combustion engine. In addition, two-way valves are advantageous for controlling the spill or backflow of fluid from a fuel injector or other engine component.

Effective operation of two-way control valves during engine operation is critical to overall engine performance. If a valve is unable to open or close under various engine conditions, or is inadvertently opened or closed at an inappropriate time during operation, then the benefit of a control valve becomes moot. To ensure effective operation, a control valve must be designed and manufactured to withstand a variety of conditions which exist in an internal combustion engine, such as high pressures. Specifically, fluid pressures acting on a valve element of a two-way valve may provide enough force to close or open the control valve prematurely which could have undesired consequences. In particular, certain control valves that are not pressure balanced, such as disclosed in U.S. Pat. No. 4,905,960, are susceptible to uncontrolled valve closing or "blow shut" when fluid pressure forces overcome the spring force which maintains the valve in an open position. This may occur during normal supply flow and reverse supply flow conditions. Under normal engine operations, "blow shut" should not occur. One proposed solution for preventing "blow shut" is to increase spring preload. However, an increased biasing force requires a solenoid capable of generating greater pulling loads to overcome the biasing force thereby undesirably resulting in a larger, more expensive solenoid assembly. Another possible solution is to use a pressure balanced valve structure. However, a pressure balanced valve design would undesirably introduce an additional leakage path. At very high flow rates, the above solutions would not be practical and would significantly increase manufacturing costs.

Ideally, a solution which utilizes existing valve architecture to address the problems of conventional valve designs would be desired. U.S. Pat. No. 4,582,294 to Fargo discloses a three way solenoid valve wherein an inlet is defined by an orifice which causes fluid flow to act upon the valve in the opening direction of the valve before the fluid flow direction is again reversed. The solenoid valve of Fargo is pressure balanced in an open position and does not appear to be influenced by fluid pressure forces acting to close the valve. Fargo does not recognize the "blow shut" problem and therefore does not provide a solution for counteracting fluid pressure forces acting to close the valve.

In order to effectively and practically prevent the problem of "blow shut" during normal engine operating conditions as discussed above, a flow control valve having a simple design to counteract adverse fluid pressure forces acting to close the valve is needed. Moreover, the magnitude of counteracting forces should be adjustable in order for a user to custom design the flow control valve for specific applications. Finally, a flow control valve having an increased flow capacity while preventing the occurrence of "blow shut" during normal operating conditions is also desired to improve upon the current flow control valve designs.

SUMMARY OF THE INVENTION

In view of the foregoing, it is an object of the present invention to provide an improved flow control valve for use in an internal combustion engine designed to prevent uncontrolled valve closing under normal engine operation conditions.

It is another object of the present invention to achieve the above object and provide an improved flow control valve that effectively increases the flow capacity of the valve during engine operation while preventing uncontrolled valve closing under normal operation conditions.

It is also an object of the present invention to achieve one or more of the above objects and to further provide an improved flow control valve for use in an internal combustion engine designed to use fluid flow to counteract adverse fluid pressure forces acting to close the flow control valve during normal engine operation conditions.

It is further an object of the present invention to achieve one or more of the above objects and to further provide an improved flow control valve for use in an internal combustion engine having a valve element positioned adjacent a flow deflecting surface to create a predetermined flow path for directing fluid flow in a direction to force the valve element toward an open position.

It is yet another object of the present invention to achieve one or more of the above objects and to further provide an improved flow control valve for use in an internal combustion engine having an removable insert with a flow deflecting surface positioned adjacent a valve element to create a flow path in which fluid flow is directed to yield a flow force sufficient to overcome adverse fluid pressure forces acting to close the valve prematurely.

It is also another object of the present invention to achieve one or more of the above objects and to further provide an improved flow control valve for use in an internal combustion engine having a predetermined flow path angle that may be adjusted to increase or decrease the fluid flow forces created when fluid flows therethrough in order to counteract adverse fluid pressure forces acting to close the valve prematurely.

It is further an object of the present invention to achieve one or more of the above objects and to further provide an improved flow control valve for use in an internal combustion engine having a predetermined flow path angle and diameter designed to increase the velocity of fluid flow between an inlet and an outlet of the flow control valve.

It is also an object of the present invention to achieve one or more of the above objects and to further provide an improved flow control valve for use in an internal combustion engine designed to prevent premature closing of the valve under any valid engine operating conditions.

It is another object of the present invention to achieve one or more of the above objects and to further provide an improved flow control valve for use in an internal combustion engine having a flow deflecting surface extending at a predetermined flow deflector angle in the range of 15° to 45°.

These, as well as other objects of the present invention are achieved by a control valve comprising a valve housing including a valve cavity, an inlet means formed in the valve housing for directing fluid into the valve cavity, and an outlet means formed in the valve housing for directing fluid out of the valve cavity. The control valve further includes a valve element mounted for reciprocal movement in the valve cavity between open and closed positions and biased toward the closed position by fluid pressure forces. A valve seat is associated with the valve element which engages the valve seat when in the closed position and permits flow between the valve seat and the valve element when in the open position. A flow force inducing means is positioned adjacent the valve element for redirecting fluid from the inlet means through a predetermined flow path arranged relative to the valve element to cause fluid flow to impact the valve element and create flow induced forces of sufficient magnitude necessary to advantageously counteract the fluid pressure forces.

The valve element includes a recess and the flow force inducing means includes a flow deflecting extension positioned on the valve housing which extends at least partially into the recess. The recess extends annularly around the valve element and the flow deflecting extension extends annularly around the valve housing.

The flow deflecting extension may be formed integrally on the valve housing or comprise an insert removably mounted on the valve housing. A flow deflecting surface is provided on the flow deflecting extension and is shaped and positioned relative to the valve element so as to deflect fluid through the predetermined flow path at a predetermined deflected angle relative to the valve element. The flow detecting surface may be an annular frusto-conically shaped surface extending at a predetermined deflector angle of between 15° and 45° relative to the axis of movement of the valve.

The flow induced forces are of a sufficient magnitude to counteract the pressure forces to maintain the valve element in an open position for a predetermined range of engine operation conditions. The flow force inducing means is positioned adjacent the predetermined flow path so as to increase the velocity of fluid travelling between the inlet means and the outlet means. The flow force inducing means further includes an annular wall portion formed on the valve element for directing fluid flow into the flow deflecting surface.

DETAILED DESCRIPTION OF PREFERRED EMBODIMENTS

Figure 1A:
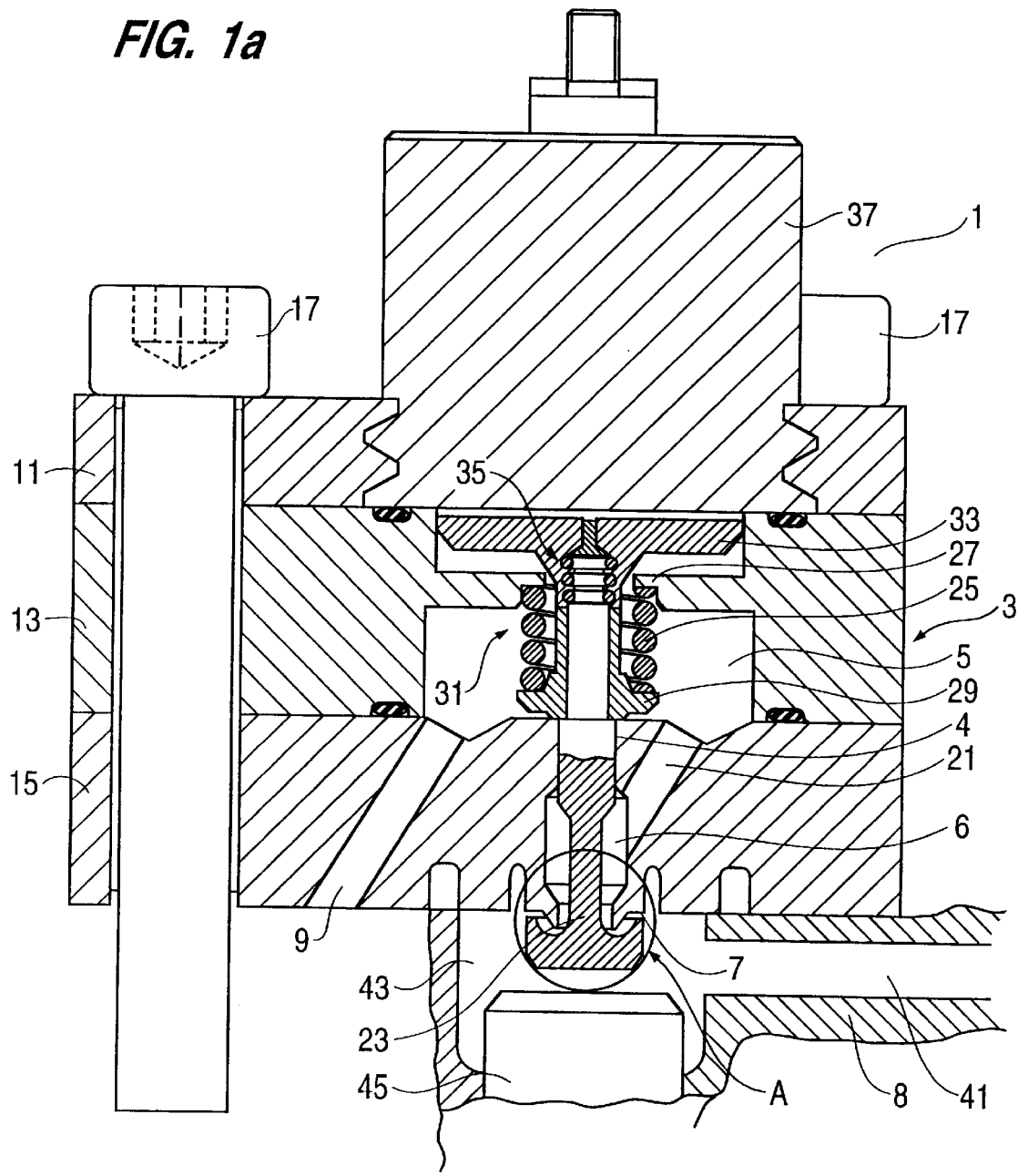
FIG. 1a is a cross-sectional view of a control valve in accordance with the preferred embodiment of the present invention.

FIG. 1a of the drawings illustrates a control valve 1 which is designed to prevent uncontrolled valve closing due to pressure forces overcoming the spring force, or other similar force acting to maintain the valve in an open position, by using flow induced forces to partially counteract the pressure or closing forces. The structure of control valve 1 is discussed in detail below, for both preferred and alternative embodiments, with respect to FIGS. 1a–1c and 2. A discussion of the operation and characteristics (i.e., pressure and velocity flow fields) of control valve 1 relating to the flow of fluid passing therethrough is provided with reference to FIGS. 4, 6 and 8. A conventional control valve model is discussed herein with respect to FIGS. 3, 5 and 7 to provide a comparison of control valve operation and characteristics.

Control valve 1 of FIG. 1a comprises a valve housing 3 including an upper housing section 11, a middle housing section 13 and a lower housing section 15 which are positioned in compressive abutment and rigidly attached together by one or more threaded fasteners 17. Fasteners 17 are used to mount housing 3 on a support body 8. A valve cavity 5 is formed in middle housing section 13 and a valve bore 4 is formed in lower housing section 15 adjacent cavity 5. An annular inlet cavity 6 is formed along valve bore 4 and a fluid passage 21 formed in lower housing section 15 to provide fluid communication between annular inlet cavity 6 and valve cavity 5. Also, supply passage 9 extends through lower housing section 15 to fluidically connect cavity 5 with a low pressure supply drain.

Control valve 1 further includes a valve element 23 mounted for reciprocal movement in valve cavity 5, bore 4 and annular cavity 6. Valve element 23 is movable between an open position (as illustrated in FIG. 1a) and a closed position (as illustrated in FIG. 1c). Valve element 23 extends through an inner radial extent of an axial spring 25 which biases valve element 23 toward the open position. Axial spring 25 seats at one end on an annular ridge 27 formed in middle housing section 13 and at an opposite end, an axial sleeve 29. Axial sleeve 29 is rigidly mounted on valve element 23 such that valve element 23 and axial sleeve 29 move in unison.

Control valve 1 further includes an armature 33 rigidly mounted on an end of valve element 23 by, for example, a molten metal connection. Armature 33 is disc-shaped and positioned in abutment with an end of axial sleeve 29. An attractive electromagnetic force, created by a solenoid assembly, moves armature 33 in an upward direction and valve element 23 into a closed position when the solenoid assembly 37 is energized. Solenoid 37 attaches to the housing of control valve 1 in a conventional manner. Actuation, or energization, of solenoid 37 is controlled to cause movement between open and closed positions at the desired times, during engine operation.

As shown in FIG. 1a, control valve 1 may be used to control the effective displacement of a variable volume high pressure pump 40 (only partially shown). For example, high pressure pump 40 may be of the type described in U.S. Pat. No. 5,676,114, the entire contents of which is hereby incorporated by reference. Pump 40 includes a plunger 45 reciprocally operated to pressurize fluid in a chamber 43 when moved in the closed position. A high pressure outlet passage 41, formed in support body 8, supplies high pressure fluid to a load device, such as a common rail and a set of injectors. Of course, control valve 1 could also be associated with a single unit injector for controlling the effective displacement of the injector plunger. In either application, the fluid flow from the pump chamber 43 through valve 1, when the valve is in the open position, results in flow induced forces on valve element 23 which undesirably tends to close the valve. This inadvertent closing of the valve element sometimes referred to as "blow shut", may result in adverse fuel system and engine operation. The control valve of the present invention is designed to operate properly without being unduly influenced by extreme fluid pressures.

The critical features of control valve 1 which operate to prevent fluid pressure influences are identified in the regions denoted by a reference letter A in FIG. 1a. An exploded view of these features is illustrated in FIG. 1b and is discussed in detail below.

Figure 1B:
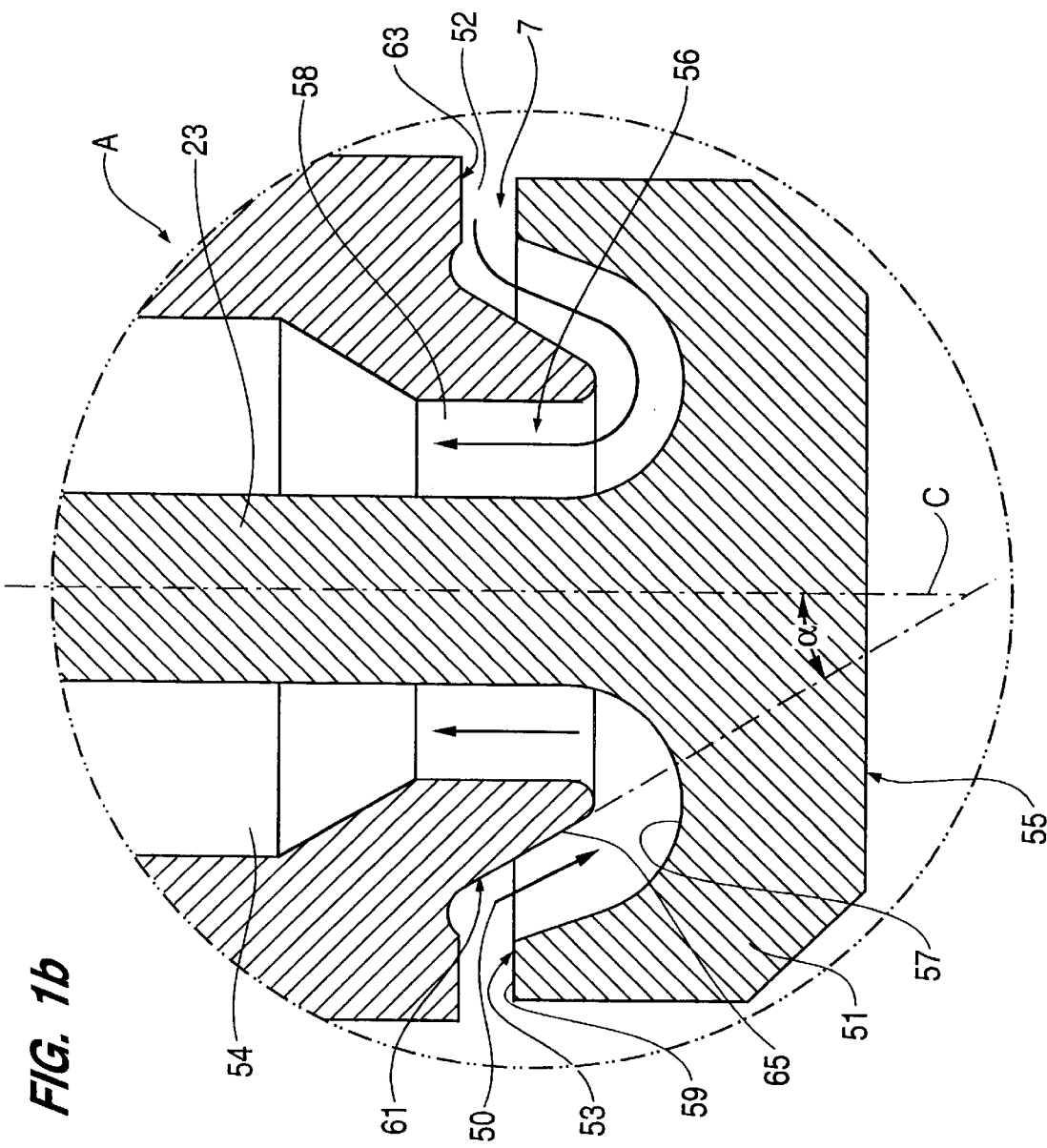
FIG. 1b is an exploded view of a portion the control valve illustrated in FIG. 1a, noted by reference letter A, in an open position in accordance with the preferred embodiment of the present invention.
Figure 1C:
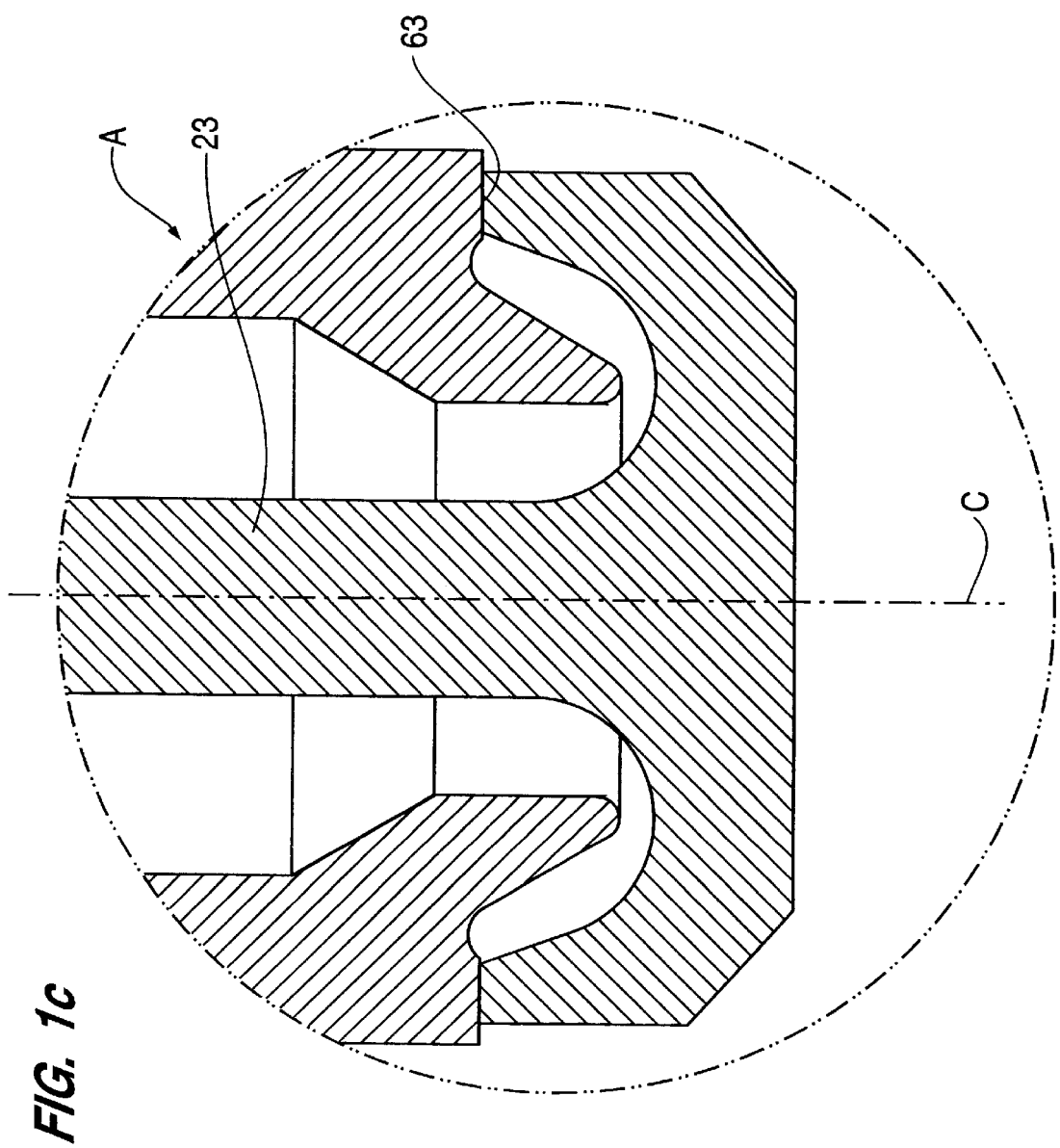
FIG. 1c is an exploded view of a portion the control valve illustrated in FIG. 1a, noted by reference letter A, in a closed position in accordance with the preferred embodiment of the present invention.

As shown in FIG. 1b, valve element 23 includes a valve head 51 formed on one end which includes an inner face 53 formed adjacent lower housing 15 and an outer face 55 formed on the end of element 23. A valve seat 63 formed on lower housing 15 is positioned opposite inner face 53 for engagement by a valve surface 59 formed on inner face 53 when valve element 23 is in the closed position, as shown in FIG. 1c. When valve element 23 is in an open position as shown in FIG. 1b, a valve passage 7 is formed between valve seat 63 and valve surface 59. Fluid may flow through a predetermined flow path 50 having a flow path inlet 52 and a flow path outlet 54 for fluid flowing in the direction of the arrows, such as experienced during a pumping stroke of plunger 45. An annular recess 57 is formed in inner face 53 to define a portion of predetermined flow path 50. Annular recess 57, which has a concave shape in the preferred embodiment, may, however, be otherwise shaped as long as the flow characteristics discussed hereinbelow are achieved.

Lower housing section 15 includes a flow deflecting extension 61 and a flow extension face 58 formed integrally on lower housing section 15 and extending annularly around lower housing section 15. Flow deflecting extension 61 further includes a flow deflecting surface 65 shaped and positioned relative to valve element 23 so as to deflect fluid flowing from the valve seat to cause the fluid to flow toward annular recess 57 and through predetermined flow path 50 at a predetermined deflected flow angle relative to valve element 23. In the preferred embodiment, flow deflecting surface 65 includes an annular frusto-conically shaped surface.

FIG. 1b illustrates control valve 1 in a fully open position with valve element 23 at its furthest distance away from lower housing section 15. In an open position, fluid is able to flow through inlet passage 7 along flow path 50 in the direction of the flow arrows illustrated in the FIG. 1b. Flow deflecting extension 61 extends at least partially into recess 57 in order for flow deflecting surface 65 to direct fluid flow through the flowpath 50 at a predetermined deflected flow angle relative to the valve element centerline/longitudinal axis C. The predetermined deflected flow angle of the fluid is determined by the shape and angular position of flow deflecting surface 65 relative to the longitudinal axis C. In the present embodiment, flow deflecting surface 65 is frustoconically shaped. Therefore, the angular position of flow deflecting surface 65 determines the predetermined deflected flow angle of the fluid. Flow deflecting surface 65 extends at a predetermined deflector angle α which causes fluid flowing along flow path inlet 52 to impact inner face 53 of valve element 23 in recess 57 and create flow induced forces of sufficient magnitude necessary to advantageously counteract any fluid pressure forces acting on valve element 23, such as at outer face 55, which tend to move valve element 23 toward a closed position. The predetermined deflector angle α may range between 15° and 45°, however, an angle of approximately 30° is preferred. This deflector angle will cause the flow to impact the valve at a deflected flow path angle between 15° and 45°, which effectively creates fluid flow induced forces of sufficient magnitude to counteract pressure forces as discussed hereinbelow. Of course, flow deflecting surface 65 may be another shape, such as a concave design, which directs the fuel flow into a similar predetermined flow path angle between 15° and 45°.

After the fluid flowing along predetermined flow path 50 reaches the bottom of recess 57, the fluid is deflected upward through a narrow passageway 56 defined by flow extension face 58 and valve element 23, which may have a substantially parallel relationship. The velocity of fluid flowing through this portion of flow path 50 increases due to the narrow flow area of passageway 56 and is forced through flow path outlet 54 and into annular inlet cavity 6.

In the closed position, valve element 23 engages valve seat 63, as illustrated in FIG. 1c, which is formed adjacent flow deflecting extension 61. Fluid may not pass through valve passage 7 (FIG. 1b) when valve element 23 is in a closed position. The timing associated with the closing of valve element 23 is controlled in the present invention and may be modified for various engine conditions as desired by a user. As described above, valve element 23 is biased open by axial spring 25 (FIG. 1a) and closes when solenoid 37 provides an attractive force to armature 33 to raise valve element 23 upward until it seats against valve seat 63 to close and seal valve passage 7.

Figure 2:
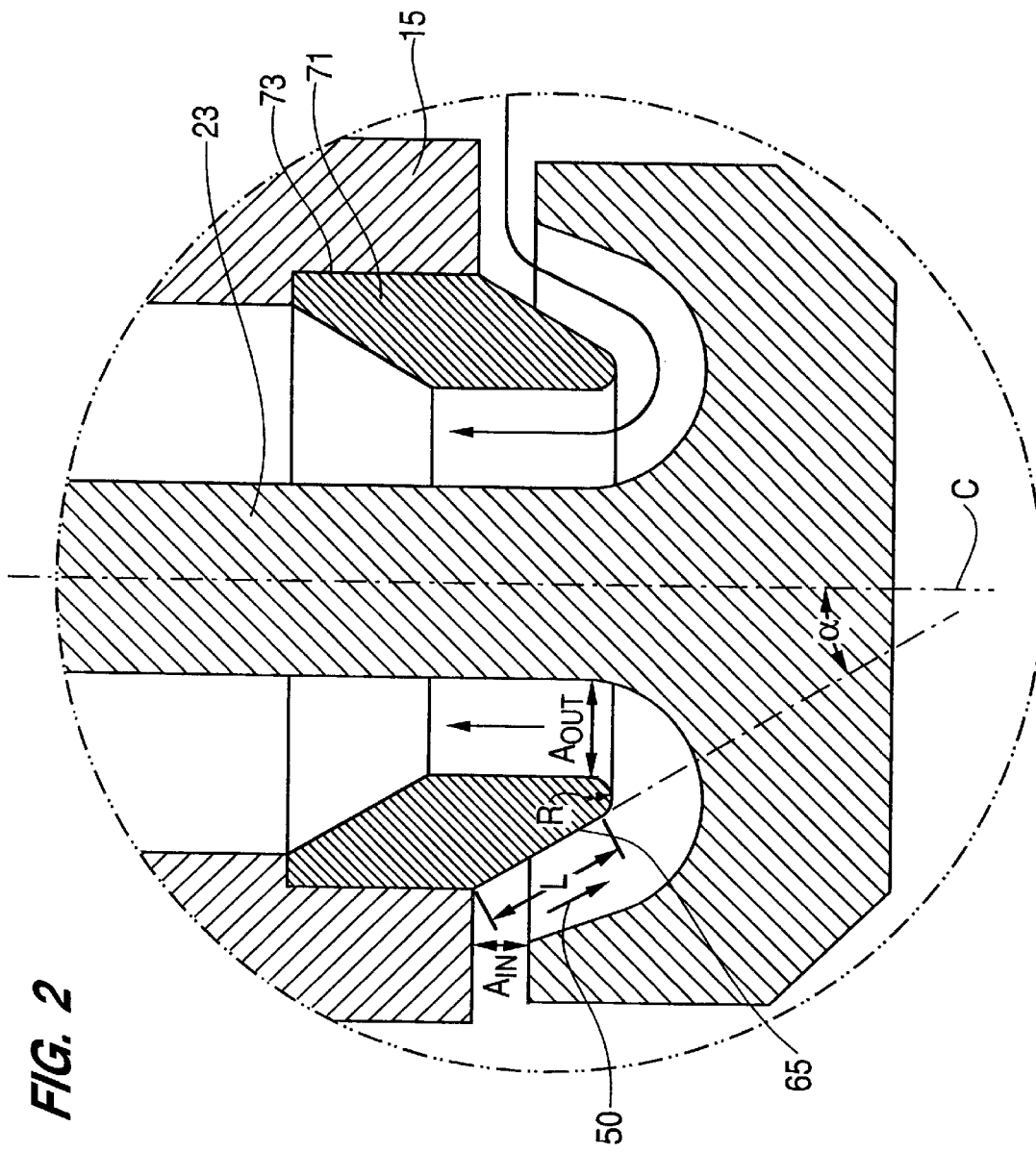
FIG. 2 is an exploded view of an insert positioned in the control valve portion of FIG. 1b in accordance with an alternative embodiment of the present invention.

The exploded view of valve element 23 with respect to lower housing section 15 illustrated in FIG. 2 is similar to the view of FIG. 1b, however, FIG. 2 further illustrates an alternative embodiment of the present invention. Specifically, FIG. 2 shows an insert 71 which is removably mounted on lower housing section 15. Preferably, insert 71 is ring-shaped and is frictionally mounted in an annular groove 73 formed in lower housing section 15. Like the flow deflecting extension 61 of the first embodiment, insert 71 includes flow deflecting surface 65 extending at the predetermined deflector angle α for deflecting fluid through flow path 50 at a predetermined deflected flow angle relative to valve element 23. Flow deflecting surface 65 of insert 71 may also include an annular frusto-conically shaped surface. The shape and position of insert 71 on lower housing section 15 is identical to flow deflecting extension 61 of the previous embodiment. Since insert 71 is removable, it may be interchanged with another insert having different flow altering characteristics. For example, an insert having a different shape or flow deflecting surface may be used to modify the deflected angle of flow path 50 with respect to valve element 23. A different deflected angle would ultimately alter the flow induced forces acting to maintain valve element 23 in an open position.

Figure 3:
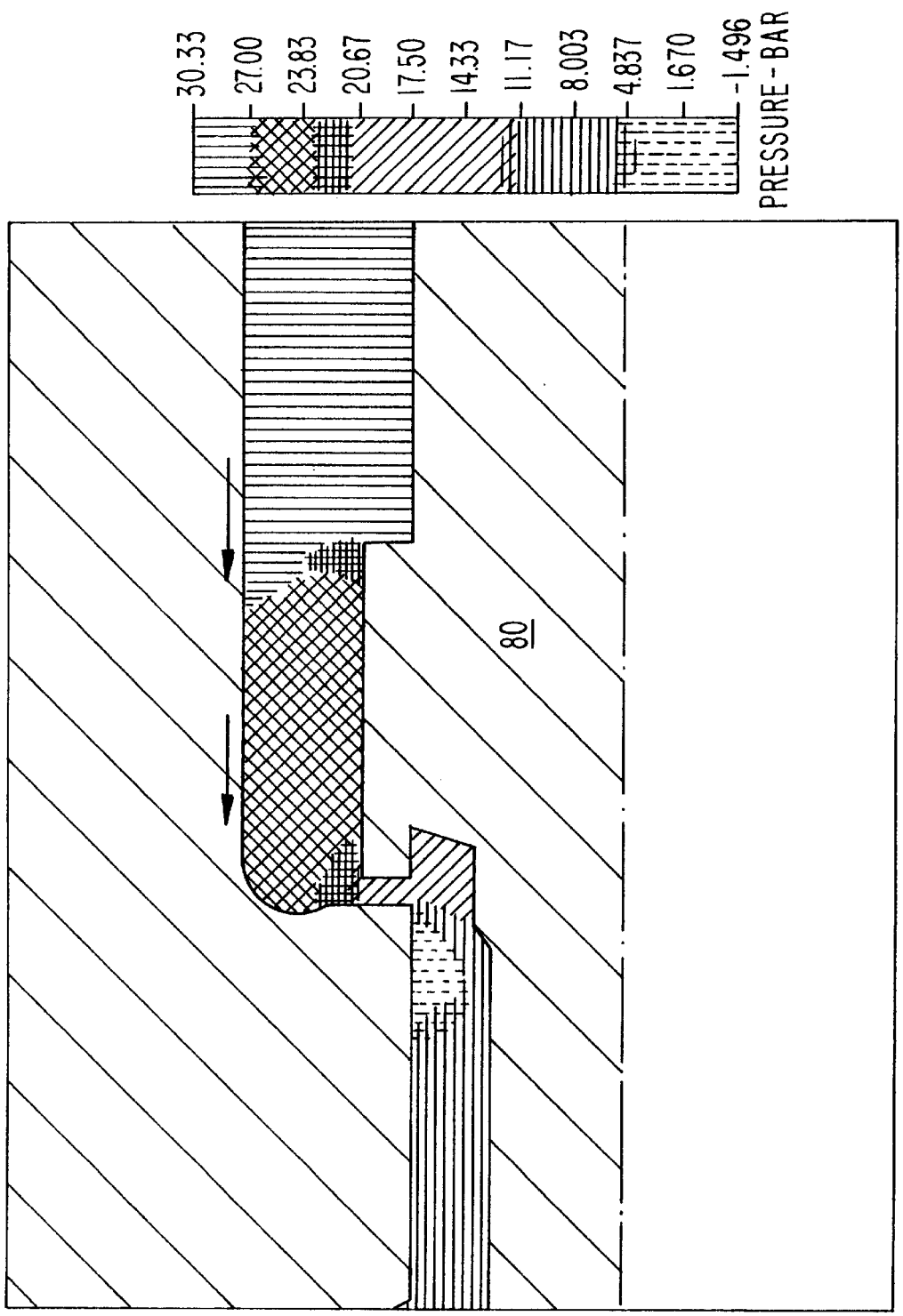
FIG. 3 is a partial flow model indicating the pressure field of fluid passing through a conventional control valve.

One of the critical features of the invention is the positioning of flow deflecting extension 61 relative to valve element 23 for redirecting fluid from inlet passage 7 through flow path 50 to cause fluid flow to impact valve element 23 and create flow induced forces of sufficient magnitude necessary to advantageously counteract fluid pressure forces acting to bias valve element 23 toward a closed position. In a conventional control valve, as illustrated in FIG. 3, fluid pressure forces may cause the control valve to close prematurely during the optimal range of engine operation. If the valve closes prematurely, excess fluid is unable to drain properly thereby undesirably increasing back flow fluid pressure which could hinder engine performance. Specifically, FIG. 3 shows a partial flow model of fluid pressure forces acting on one side of a valve element 80. The direction of fluid flow is indicated by the arrows in FIG. 3 and the color regions indicate areas along the fluid flow path where the fluid pressure forces act on valve 80, the degree of which is shown in the legend provided in FIG. 3. In this conventional control valve flow model, fluid pressure forces significantly decrease after fluid flows into control valve 1 thus, creating virtually no fluid force on valve 80 to counteract fluid pressure forces acting to bias the valve toward a closed position. In this model, fluid pressure forces tending to close valve element 80 ultimately become greater than the force biasing the valve in an open position, e.g., fluid pressure forces and bias spring force, in which case, the valve "blows" or closes shut. Therefore, conventional control valves used in the environment described above do not permit fluid flow to be effectively, selectively and predictably controlled.

Figure 4:
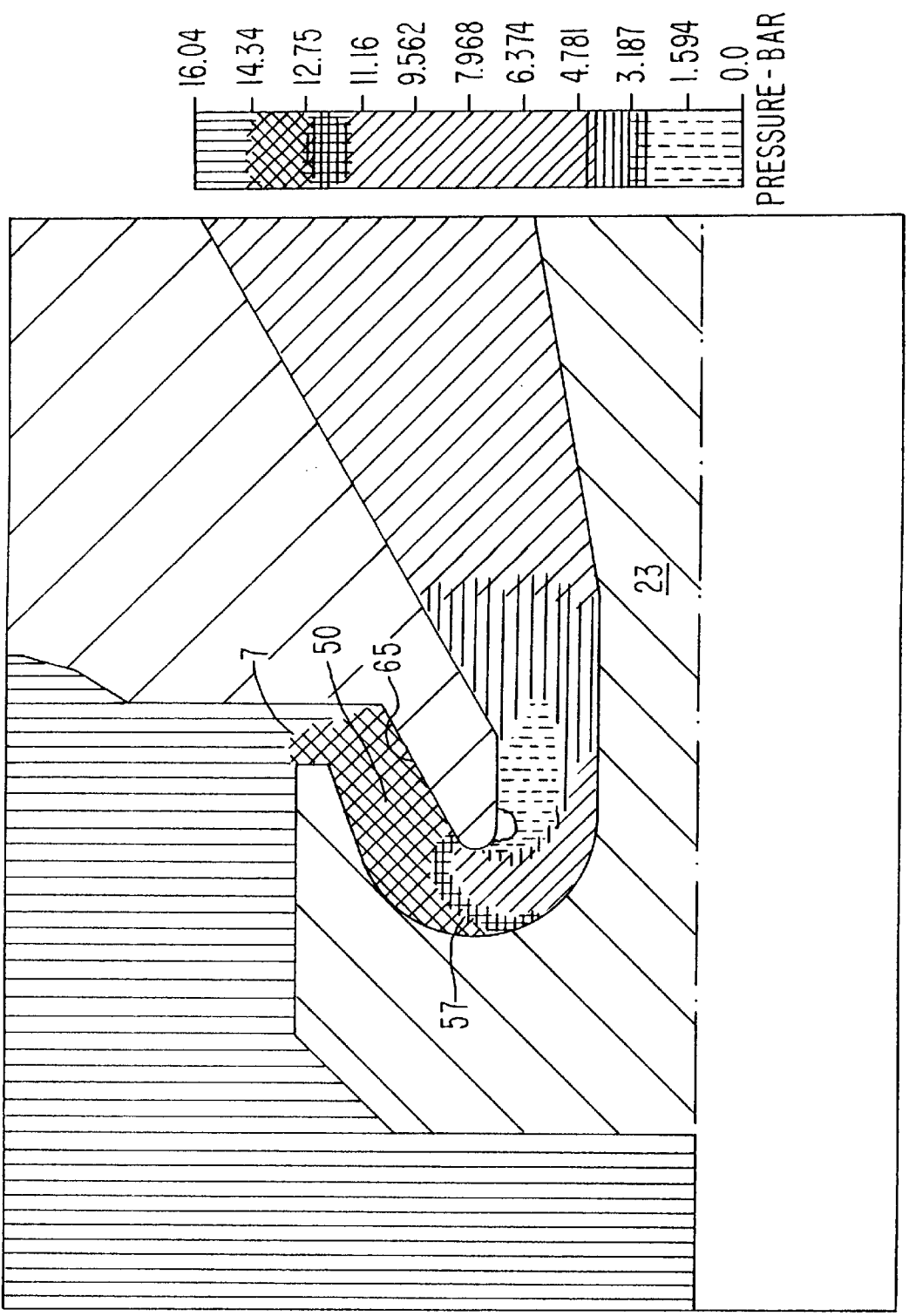
FIG. 4 is a partial flow model indicating the pressure field of fluid passing through the control valve illustrated in FIG. 1a in accordance with the preferred embodiment of the present invention.

FIG. 4 is a partial flow model indicating the pressure field of fluid passing through the control valve illustrated in FIG. 1a in accordance with the preferred embodiment of the present invention. In the flow model of the present invention, the direction of flow is indicated by the three flow arrows shown in FIG. 4. As fluid enters valve passage 7, the fluid is directed into flow path 50 by flow deflecting surface 65, illustrated in FIG. 1b. The angle of predetermined flow path 50 allows the fluid flow forces to exert significant pressure on valve element 23 as indicated by the red, orange, and yellow shading and the corresponding legend provided in FIG. 4. The flow forces generated along predetermined flow path 50 act to bias valve element 23 toward an open position and are sufficient, in combination with the bias force of spring 25 (FIG. 1), to overcome the sum of the fluid pressure forces which act to bias valve element 23 in a closed position for a predetermined range of engine characteristics, such as, engine speed. Maintaining valve element 23 in an open position over a desired engine operating range effectively increases the flow capacity of control valve 1 as compared to conventional control valves. In some cases, the flow capacity is doubled that of a conventional valve without experiencing undesirable valve closing or "blow shut." Importantly, the pressure of the fluid adjacent the valve surfaces which tend to open the valve element is greater than in the conventional design where the highest pressure is experienced adjacent the valve surfaces tending to close the valve element.

Figure 5:
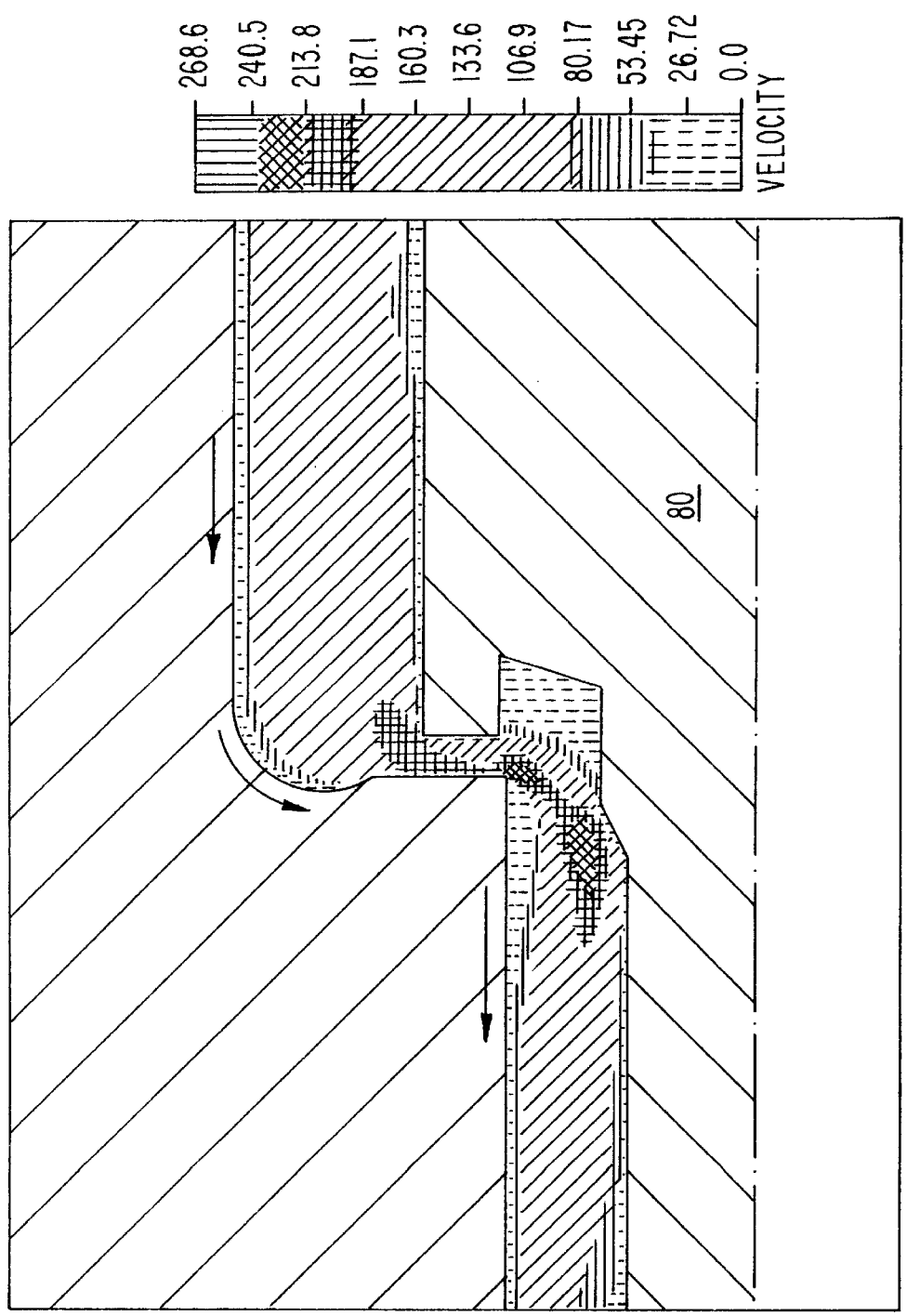
FIG. 5 is a partial flow model indicating the velocity field of fluid passing through a conventional control valve.

Another important characteristic of control valve 1 is its ability to increase the outlet flow velocity in order to increase flow induced forces on the valve in the opening direction. FIG. 5 illustrates a partial flow model indicating the velocity field of fluid passing through a conventional control valve. The fluid flowing through valve 80 travels in the direction of the flow arrows shown in FIG. 5. The velocity of fluid entering control valve 80 does not consistently increase as shown by the green region in FIG. 5. After the fluid enters the valve the fluid velocity increases for a short distance as the fluid passes around a corner of the valve, as shown by the yellow/orange region. As indicated by FIG. 5, the velocity of fluid traveling through control valve 80 is not smooth or consistent. Hence, the ability to create sufficient flow induced forces against a valve element to counteract fluid pressure forces is severely hampered since fluid velocity in the conventional valve design is not adequately controlled.

Figure 6:
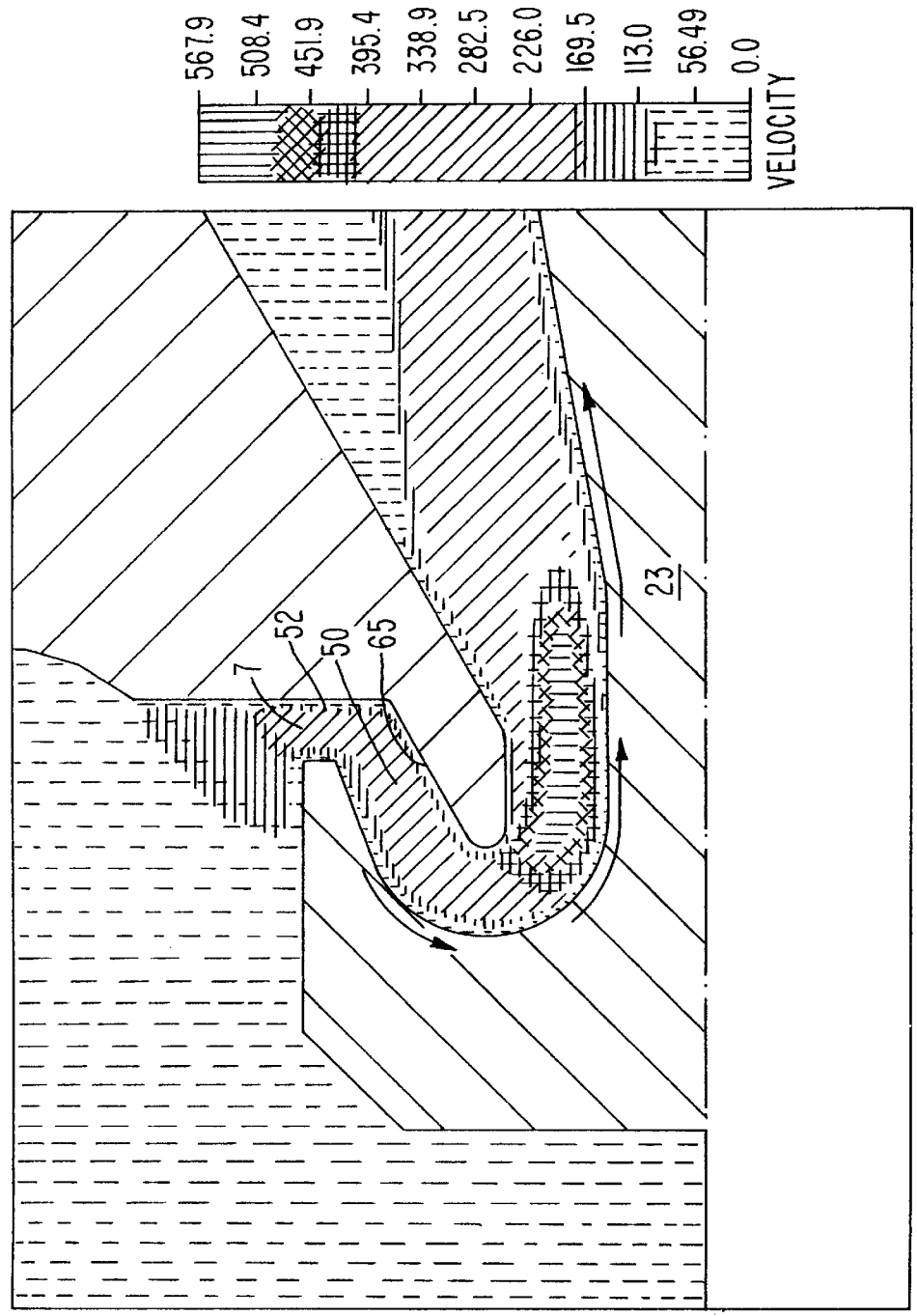
FIG. 6 is a partial flow model indicating the velocity field of fluid passing through the control valve illustrated in FIG. 1a in accordance with the preferred embodiment of the present invention.

FIG. 6 illustrates a partial flow model indicating the velocity field of fluid passing through control valve 1 of the present invention. In the flow model of the present invention, the direction of flow is indicated by the three flow arrows shown in FIG. 6. As fluid enters inlet passage 7, the fluid is directed along flow path inlet 52 of flow path 50 by flow deflecting surface 65. The predetermined deflected flow angle of flow path 50 increases the velocity of fluid travelling through flow path outlet 54 in order to create additional flow induced forces on valve element 23 in the opening direction. The red region of flow illustrates a smooth and consistent increase in flow velocity of fluid traveling through flow path 50. The advantage of a smooth and consistent increase in fluid velocity over the conventional model discussed in FIG. 5 is that greater flow control and valve flow capacity is realized.

Figure 7:
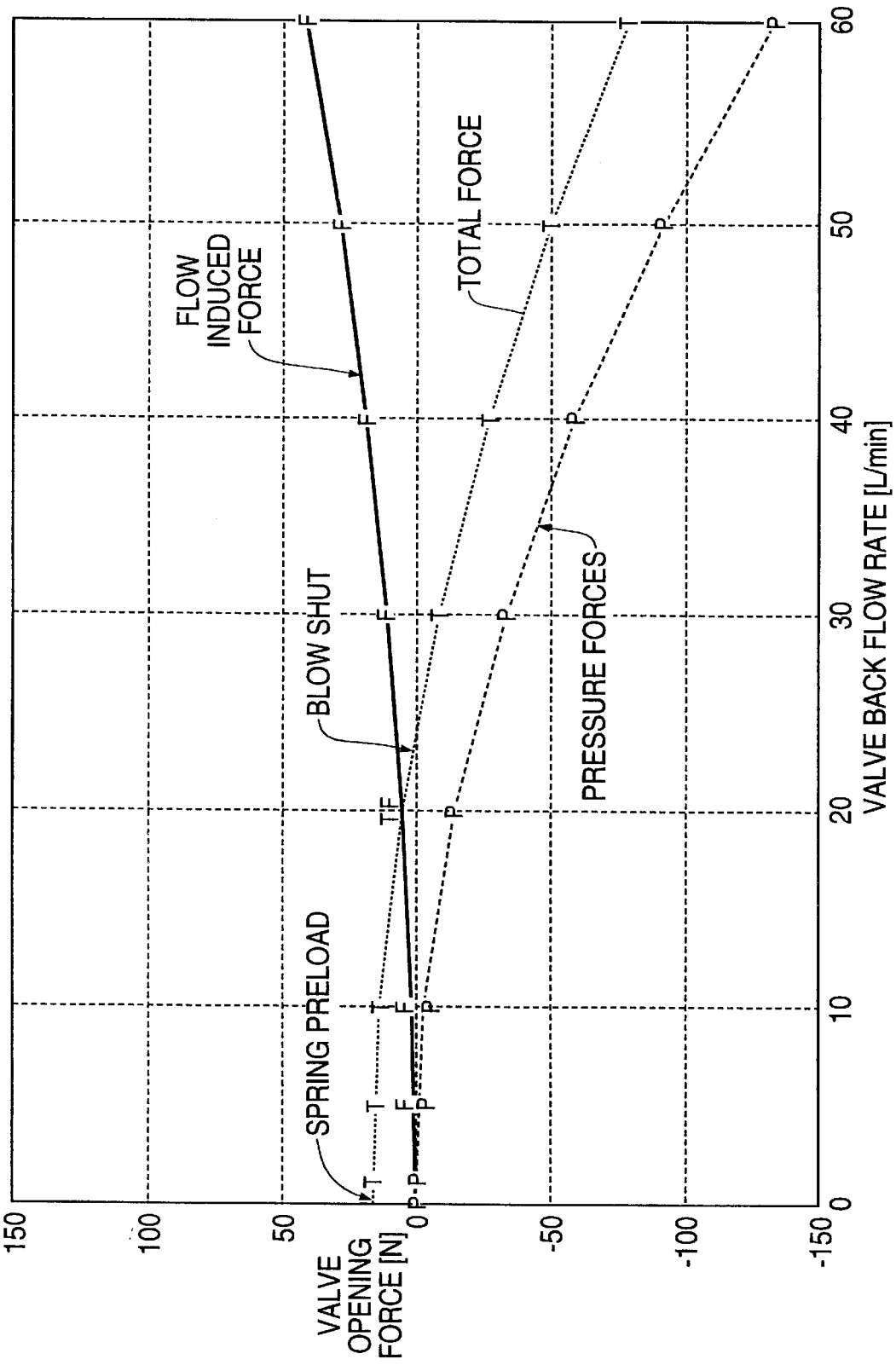
FIG. 7 is a graph of valve opening forces versus valve back flow rates under certain engine operating conditions for a conventional control valve.
Figure 8:
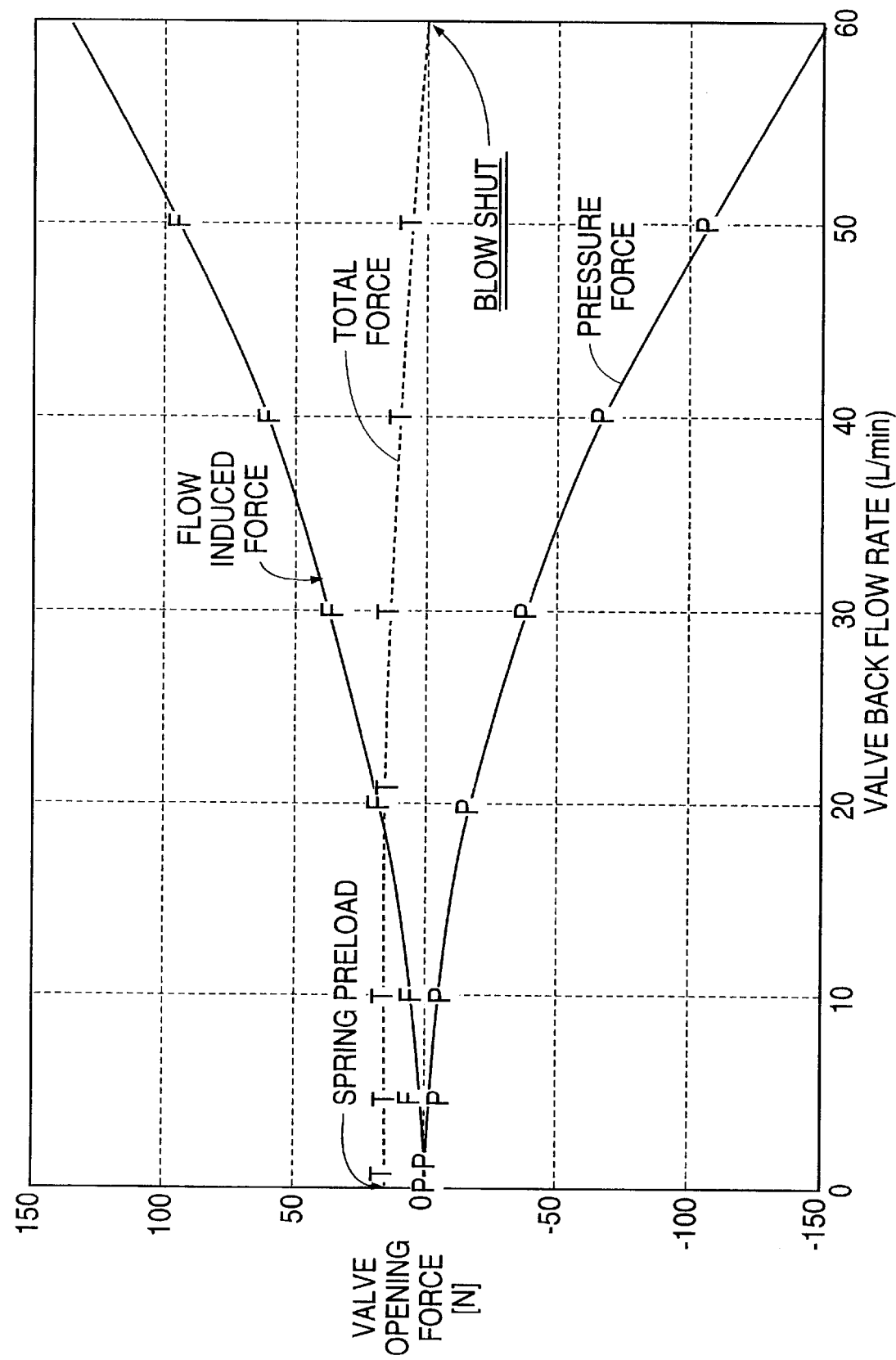
FIG. 8 is a graph of valve opening forces versus valve back flow rates under certain engine operating conditions for the control valve illustrated in FIG. 1a in accordance with the preferred embodiment of the present invention.

FIGS. 7 and 8 are an illustration of forces acting on a conventional control valve and control valve 1, respectively, as a function of spill flow rate. The forces acting on the valve are measured in Newtons and include fluid pressure forces, flow forces and spring forces. The fluid pressure force on the valve at a given spill flow rate, which includes both closing and opening pressure forces, tends to close the valve element and is denoted by a series of "P"s as a negative force in FIGS. 7 and 8. The flow forces tending to open the valve are denoted by a series of "F"s and are shown as a positive force against the control valve element. The fluid pressure forces and flow forces are negligible when the valve back flow rate is at zero. The total forces acting on the valve element is identified by a series of "T"s and include a positive spring preload opening force on the control valve element of 15 Newtons when the valve back flow rate is zero.

The valve back flow rate is measured in liters per minute and relates to the backflow of fluid from an external source, such as a pumping chamber for a pump or a timing chamber of a fluid injector. As the valve back flow rate increases, fluid pressure forces and flow forces increase and act to influence the position of the valve element of the control valve. If the fluid pressure forces acting to close the valve element are greater than the combined forces of the spring and flow force, the valve element will close or "blow shut" rendering the control valve inoperable.

Referring now to force characteristics graphically represented in FIG. 7, as the flow rate through a conventional control valve increases, the positive flow forces F tending to open the valve and fluid pressure forces P, tending to close the valve element, increase at different rates, thereby affecting the total force T. In the conventional control valve, increasing fluid pressure acting on the valve element causes the fluid pressure forces P to overcome the combined spring preload and flow forces F to close the valve element when the valve back flow rate is approximately 24 L/min. Therefore, the control valve is rendered inoperable when the flow rate is equal to or above 24 L/min which can undesirably affect engine performance under these engine operation conditions. The conventional control valve is essentially uncontrollable when "blow shut" occurs. Ideally, the control valve should be operable over a wide range of engine operation conditions, including, but not limited to, a broader range of engine speeds.

The force characteristics exhibited in the preferred embodiment of the present invention is illustrated graphically in FIG. 8. As described above, (FIG. 1b) fluid entering valve passage 7 is directed along flow path 50 which is arranged relative to valve element 23 to cause fluid flow to impact valve element 23 and create flow induced forces of sufficient magnitude necessary to advantageously counteract fluid pressure forces P tending to close the valve element. The flow induced forces are graphically illustrated in FIG. 8. As can be seen from the figure, as the valve back flow rate increases, the flow forces increase significantly as compared to the conventional control valve discussed with respect to FIG. 7. The flow forces generated in control valve 1 are able counteract the fluid pressure forces for flow rates well above 24 L/min. In fact, the flow forces achieved in control valve 1 are able to maintain valve element 23 (FIG. 1b) in an open position for engine speeds up to 60 L/min which is beyond an optimal range of engine speed for many applications. Under these conditions, the blow shut does not occur until the valve back flow rate is approximately 60 L/min. The flow forces generated on valve element 23 allow control valve 1 to operate effectively throughout a broad range of engine operation conditions which provides a significant advantage over conventional control valve designs. In addition, the flow rate of fluid passing through flow path 50 of control valve 1 is substantially improved. In view of this, control valve 1 may be used for applications where it is critical for the valve to operate efficiently and effectively under adverse environmental conditions as discussed herein.

The advantages of the present valve can be optimally achieved for a variety of applications and operating conditions by changing certain critical control factors in the valve design. For example, manipulation of these control factors permit a valve to be designed to achieve the desired flow induced pressure forces regardless of the fluid viscosity and flow rate. Referring to FIG. 2, the control factors include an inlet flow area $A_{IN}$, a flow area ratio $A_{OUT}/A_{IN}$ of an outlet area $A_{OUT}$ to the inlet flow area $A_{IN}$, the radius R of the distal end of flow deflecting extension 61, the predetermined deflector angle α of deflecting surface 65 and a length L along flow path inlet 52. Table I presents results of Applicants' studies indicating values for the control factors that have been found to be effective at different fuel viscosities, densities and flow rates. For example, a valve having a greater inlet flow area $A_{IN}$ and a larger flow area ratio $A_{OUT}/A_{IN}$ could be used for higher viscosity fuels to achieve the desired flow and force characteristics discussed hereinabove. Of course, these control factors exist for both the embodiments of FIGS. 1a–1c and 2.

TABLE I

| CONTROL FACTORS | Example 1 | Example 2 | Example 3 |
| --- | --- | --- | --- |
| $A_{IN}$ [mm2] - Input Flow Area | 14.5 | 19 | 10 |
| $A_{OUT}/A_{IN}$ [%] - Flow Area Ratio | 67.5 | 100 | 50 |
| R [mm] - Flow Deflector Nose Radius | 0.2 | 0.4 | — |
| α [deg] - Flow Deflector Angle (Vertical = 0 deg) | 30 | 20 | 40 |
| L [mm] - Flow Deflecting Length | 1.55 | 2 | 1.1 |

TABLE I-continued

| (straight part only) EXTERNAL FACTORS | | | |
| --- | --- | --- | --- |
| Fuel Type | Light | Heavy | |
| v [cSt] - Viscosity | 1 | 9 | |
| Ro [Kg/m3] - Density | 800 | 920 | |
| INPUT FACTOR | | | |
| Q [L/min] - Fuel Flow Rate | 20 | 40 | 60 |

Industrial Applicability

The valve assembly may be employed in any environment where it is essential for the control valve is able to operate effectively under adverse pressure conditions, and more particularly, within a broad range of predetermined engine operating conditions.

What is claimed is:

1. A control valve, comprising;
   a valve housing including a valve cavity;
   an inlet means formed in said valve housing for directing fluid into said valve cavity;
   an outlet means formed in said valve housing for directing fluid out of said valve cavity;
   a valve element mounted for reciprocal movement in said valve cavity between open and closed positions, said valve element biased toward said closed position by fluid pressure forces;
   a valve seat associated with said valve element, said valve element engaging said valve seat when in said closed position and permitting flow between said valve seat and said valve element when in said open position; and
   a flow force inducing means positioned adjacent said valve element for redirecting fluid from said inlet means through a predetermined flow path arranged relative to said valve element to cause fluid flow to impact said valve element and create flow induced forces of sufficient magnitude necessary to advantageously counteract said fluid pressure forces, wherein said valve element includes a recess and said flow force inducing means includes a flow deflecting extension positioned on said valve housing which extends at least partially into said recess.

2. The valve of claim 1, wherein said flow deflecting extension is formed integrally on said valve housing.

3. The valve of claim 1, wherein said flow deflecting extension is an insert removably mounted on said valve housing.

4. The valve of claim 1, wherein said flow deflecting extension includes a flow deflecting surface shaped and positioned relative to said valve element so as to deflect fluid through said predetermined flow path at a predetermined deflected angle relative to said valve element.

5. The valve of claim 4, wherein said flow deflecting surface includes an annular frusto-conically shaped surface.

6. The valve of claim 1, wherein said recess extends annularly around said valve element and said flow deflecting extension extends annularly around said valve housing.

7. The valve of claim 1, wherein said flow induced forces are of a sufficient magnitude to counteract said pressure forces to maintain said valve element in said open position for a predetermined range of engine operation conditions.

8. The valve of claim 1, wherein said flow force inducing means is positioned adjacent said predetermined flow path so as to increase the velocity of fluid travelling through said predetermined flow path.

9. The valve of claim 4, wherein said flow force inducing means further includes an annular wall portion formed on said valve element for directing fluid flow into said flow deflecting surface.

10. A control valve, comprising;
   a valve housing including a flow deflecting extension, a valve cavity, an inlet passage and an outlet passage communicating with said valve cavity;
   a valve element mounted for reciprocal movement in said valve cavity between open and closed positions, said valve element biased toward said closed position by fluid pressure forces; and
   a valve seat associated with said valve element and formed adjacent said flow deflecting extension, said valve element engaging said valve seat when in said closed position and permitting flow between said valve seat and said valve element when in said open position,
   wherein said flow deflecting extension is positioned adjacent said valve element for redirecting the flow of fluid through a predetermined flow path, said flow path having a predetermined deflected angle defined by said flow deflecting extension and said valve element to produce flow induced opening forces against said valve element to counteract said fluid pressure forces, wherein said flow induced forces are of a sufficient magnitude to counteract said pressure forces to maintain said valve element in said open position for a predetermined range of engine operation conditions.

11. The valve of claim 10, wherein said valve element includes a recess and said flow deflecting extension extends at least partially into said recess.

12. The valve of claim 11, wherein said flow deflecting extension includes a flow deflecting surface shaped and positioned relative to said valve element so as to deflect fluid through said predetermined flow path at a predetermined deflector angle relative to said valve element.

13. The valve of claim 12, wherein said flow detecting surface includes an annular frusto-conically shaped surface.

14. The valve of claim 11, wherein said recess extends annularly around said valve element and said flow deflecting extension extends annularly around said valve housing.

15. The valve of claim 10, wherein said flow deflecting portion is positioned adjacent said predetermined flow path so as to increase the velocity of fluid travelling through said predetermined flow path.

16. The valve of claim 10, wherein said predetermined deflector angle is of a magnitude between 15° and 45°.

17. A control valve, comprising;
   a valve housing including a valve cavity;
   an inlet means formed in said valve housing for directing fluid into said valve cavity;
   an outlet means formed in said valve housing for directing fluid out of said valve cavity;
   a valve element mounted for reciprocal movement in said valve cavity between open and closed positions, said valve element biased toward said closed position by fluid pressure forces;
   a valve seat associated with said valve element, said valve element engaging said valve seat when in said closed position and permitting flow between said valve seat and said valve element when in said open position; and
   a flow force inducing means positioned adjacent said valve element for redirecting fluid from said inlet means through a predetermined flow path arranged relative to said valve element to cause fluid flow to impact said valve element and create flow induced forces of sufficient magnitude necessary to advantageously counteract said fluid pressure forces, wherein said flow force inducing means is positioned adjacent said predetermined flow path so as to increase the velocity of fluid travelling through said predetermined flow path.

18. A control valve, comprising;
   a valve housing including a flow deflecting extension, a valve cavity, an inlet passage and an outlet passage communicating with said valve cavity;
   a valve element mounted for reciprocal movement in said valve cavity between open and closed positions, said valve element biased toward said closed position by fluid pressure forces; and
   a valve seat associated with said valve element and formed adjacent said flow deflecting extension, said valve element engaging said valve seat when in said closed position and permitting flow between said valve seat and said valve element when in said open position,
   wherein said flow deflecting extension is positioned adjacent said valve element for redirecting the flow of fluid through a predetermined flow path, said flow path having a predetermined deflected angle defined by said flow deflecting extension and said valve element to produce flow induced opening forces against said valve element to counteract said fluid pressure forces, wherein said flow deflecting portion is positioned adjacent said predetermined flow path so as to increase the velocity of fluid travelling through said predetermined flow path.

19. A control valve, comprising;
   a valve housing including a flow deflecting extension, a valve cavity, an inlet passage and an outlet passage communicating with said valve cavity;
   a valve element mounted for reciprocal movement in said valve cavity between open and closed positions, said valve element biased toward said closed position by fluid pressure forces; and
   a valve seat associated with said valve element and formed adjacent said flow deflecting extension, said valve element engaging said valve seat when in said closed position and permitting flow between said valve seat and said valve element when in said open position,
   wherein said flow deflecting extension is positioned adjacent said valve element for redirecting the flow of fluid through a predetermined flow path, said flow path having a predetermined deflected angle defined by said flow deflecting extension and said valve element to produce flow induced opening forces against said valve element to counteract said fluid pressure forces, wherein said predetermined deflector angle is of a magnitude between 15° and 45°.

* * * * *